United States Patent
Astely et al.

(10) Patent No.: US 8,537,688 B2
(45) Date of Patent: *Sep. 17, 2013

(54) METHOD AND A DEVICE FOR ENHANCED PERFORMANCE IN A CELLULAR WIRELESS TDD SYSTEM

(75) Inventors: David Astely, Bromma (SE); Per Skillermark, Stockholm (SE); Tobias Tynderfeldt, Solna (SE); Erik Westerberg, Enskede (SE); Hannes Ekström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 673 days.

This patent is subject to a terminal disclaimer.

(21) Appl. No.: 12/528,344

(22) PCT Filed: Feb. 23, 2007

(86) PCT No.: PCT/SE2007/050108
§ 371 (c)(1),
(2), (4) Date: Aug. 24, 2009

(87) PCT Pub. No.: WO2008/103090
PCT Pub. Date: Aug. 28, 2008

(65) Prior Publication Data
US 2010/0097964 A1    Apr. 22, 2010

(51) Int. Cl.
*G01R 31/08* (2006.01)
(52) U.S. Cl.
USPC .................. 370/241; 370/328; 370/465
(58) Field of Classification Search
None
See application file for complete search history.

(56) References Cited

U.S. PATENT DOCUMENTS

| 5,898,928 | A | 4/1999 | Karlsson et al. |
| 6,347,113 | B1 | 2/2002 | Hatch |
| 6,684,061 | B1 | 1/2004 | Yost |
| 2002/0015393 | A1* | 2/2002 | Pan et al. ............ 370/335 |
| 2002/0071415 | A1 | 6/2002 | Soulabail et al. |

(Continued)

FOREIGN PATENT DOCUMENTS

| EP | 1213855 A | 6/2002 |
| EP | 1511190 A | 3/2005 |

(Continued)

OTHER PUBLICATIONS

Mitsubishi Electric: "Idle period shortening for half duplex communications in large cells". TSG RAN WG1 R1-051180. San Diego, California, USA. Oct. 10-14, 2005.

*Primary Examiner* — Kevin C Harper (57) ABSTRACT

The invention discloses a method (1100) for a cellular wireless access TDD system (100) with a base stations (120, 220) for respective cells (110, 210) in the system, where each cell can accommodate at least a first user terminal (130, 230). The user terminals can receive traffic from their base stations during a down link period, and can transmit traffic to their base stations (120, 220) during an up link period (UL). There is a first guard period (TDu) at the transition from down link to up link, and a second guard period (TUD) at the transition from up link to down link. The method comprises measuring the interference level in a second plurality (110, 210) of cells during part of the time between two consecutive down link periods, and varying the duration of said first and/or second guard period in said second plurality of cells (110, 210) according to the interference level.

9 Claims, 11 Drawing Sheets

(56) References Cited

U.S. PATENT DOCUMENTS

| | | |
|---|---|---|
| 2003/0026215 A1 | 2/2003 | Schafer |
| 2003/0117980 A1 | 6/2003 | Kim et al. |
| 2003/0156594 A1 | 8/2003 | Trott et al. |
| 2004/0092232 A1 | 5/2004 | Zeira et al. |
| 2005/0074067 A1 | 4/2005 | Nieto et al. |
| 2006/0068715 A1 | 3/2006 | Hundal et al. |
| 2006/0087997 A1 | 4/2006 | Li |
| 2008/0080448 A1* | 4/2008 | Rottinghaus ............ 370/342 |
| 2008/0248796 A1 | 10/2008 | Oh et al. |
| 2010/0097963 A1 | 4/2010 | Astely et al. |
| 2010/0097964 A1 | 4/2010 | Astely et al. |
| 2010/0238847 A1 | 9/2010 | Suo et al. |
| 2010/0284289 A1 | 11/2010 | Suo et al. |

FOREIGN PATENT DOCUMENTS

| | | |
|---|---|---|
| WO | WO 2009/046668 A1 | 4/2009 |
| WO | WO 2010/006511 A1 | 1/2010 |
| WO | WO 2012/019321 A1 | 2/2012 |

* cited by examiner

Fig. 1

PRIOR ART

Fig. 2

PRIOR ART

METHOD AND A DEVICE FOR ENHANCED PERFORMANCE IN A CELLULAR WIRELESS TDD SYSTEM

TECHNICAL FIELD

The present invention discloses a method for use in a cellular wireless access system which comprises a first plurality of radio base stations for the control of traffic to and from respective cells in the system.

BACKGROUND

In future cellular wireless access systems, as well as in some contemporary systems, a principle which may be used is the so called TDD principle, Time Division Duplex. In TDD systems, transmissions from the base stations to the user terminals in the cells, the "down link", as well as transmissions from the user terminals to the base stations, the "up link", are carried out on the same frequency, but with a division in time.

Due to the principle employed, in a TDD system there may be interference between the uplink and the downlink, as they are located on the same frequency. Thus, for example, a user terminal transmitting uplink to a base station may cause interference in another user terminal in an adjacent cell which is receiving in the downlink. Similarly, a base station transmitting in the downlink to a user terminal may cause interference in another base station which is receiving traffic in the uplink. As is well known, interference from another base station may be very high since base stations especially when there is line-of-sight between the base stations. Similarly, two terminals may be very close to each other, in which case very high levels of interference are also possible.

This problem, i.e. interference between uplink and downlink, can be solved by synchronizing and coordinating all base stations within a certain area, so that all uplink and downlink periods occur simultaneously.

As an additional safe guard against such interference, so called "guard periods" may be inserted at the transitions between the down link and the up link periods. Usually, there is a guard time of a first duration used at the transition from down link to up link, and a guard time of a second duration at the transition from up link to down link.

Typically, the guard time at the transition from downlink to uplink is chosen to match the sum of the maximum roundtrip propagation delay in a cell and the time it takes for a user terminal to switch from reception to transmission.

Thus, due to the propagation delay, there is a delay before a user terminal can receive the downlink data. In addition, the transmission timing is controlled so that terminals with a longer propagation delay, e.g. those at the cell edge, may start their transmissions earlier to compensate for the propagation delay, in order for the data to be received within the uplink window at the base station of the cell.

The guard period at the transition between the uplink and downlink, on the other hand, is typically chosen to match the time it takes for the base station to switch from reception to transmission and the time it takes for a (close) terminal to switch from transmission to reception.

However, despite the fact that all cells in a certain area, as mentioned above, may be synchronized, there may still be interference during the uplink period. At the end of the uplink period, a base station may, due to, for example, a synchronization error, start to transmit too early, i.e. it may "cross over" to the down link too early. These transmissions will then be received in other base stations which are still in their up link period, and are thus open for reception.

Also, down link "contributions" from distant base stations which are still "in the air" due to propagation delays in the beginning of the uplink period may cause interference at a base station.

In the case of base station to base station interference, this interference may, to some extent, be mitigated by channel coding, as only a part of the uplink period is affected by interference.

If the guard periods are chosen based solely on the propagation delays to the user terminals in the cells, there may still be base station to base station interference present in the system, as mentioned above. This may occur if the guard periods are too short, and do not take into account "contributions" from distant base stations as well as "contributions" from close base stations with synchronization errors.

It can be shown that interference contributions from a single distant base station with an elevated antenna may be heard at distances up to around 60-80 km, corresponding to propagation delays of around 250 us.

Additionally, there may be interference at one base station from multiple other base stations.

In principle, interference at the edge of the up link period may be handled with channel coding, but it may be noted that this will affect the up link coverage, and that the radio base station, including the RF front end, may need to handle a very high noise "rise" at the beginning and at the end of the up link period, and that the base station will need to account for this during demodulation. Thus, for small guard periods, a more sophisticated RF front end, in addition to more advanced BB demodulation processing is needed, which might increase the complexity in the implementation of the radio base station.

Thus, two drawbacks with shortened guard periods is that the up link performance, which is already limited by the limited user terminal transmit power, will be degraded, and that the complexity of the radio base station might increase, as compared to the case where these variations are not present.

In addition, if the guard periods are chosen to also take into account interference from other radio base stations, it may be noted that the required guard time will depend on the propagation conditions between the base stations, and will thus be "deployment dependent". Additionally, as the system grows, new interference sources will be added.

Thus, the required guard time for inter-base station interference is expected to depend on the network layout, which is generally hard to predict.

Document EP 1 511 190 discloses a method by means of which an RBS can adapt the guard period between down link and up link transmissions in the cell of that RBS. This disclosure is, however, not directed at solving the problem of RBS to RBS interference.

SUMMARY

In conclusion, as described above, there is a need for a solution by means of which guard periods may adapted so that interference, particularly inter-base station interference in a cellular wireless access system such as a TDD system, may be handled better than in known systems or with known solutions.

This need is addressed by the present invention in that it discloses a method for use in a cellular wireless access TDD system which comprises a first plurality of radio base stations for the control of traffic to and from respective cells in the system.

Each of said cells is able to accommodate at least a first user terminal, and the user terminals in the cells can be scheduled to receive traffic from their respective base stations during a first time period, the down link period, and for transmitting traffic to their respective base stations during a second time period, the up link period.

In the system, there is a first guard period at the transition from the down link period to the up link period, and a second guard period at the transition from the up link period to the down link period.

The method of the invention comprises the step of measuring the interference level in at least a second plurality of cells during at least a part of the time between two consecutive down link periods, and also the step of adapting the duration of at least one of said first and second guard periods in at least the second plurality of cells in accordance with the measured interference level.

Thus, by means of the invention, a solution is disclosed which makes it possible to avoid interference between down link and up link, especially between inter-base station interference, while maintaining the guard periods at levels which are not excessively long.

In one embodiment of the invention, the interference measurements are carried out by at least a first number of the base stations and then reported to a central node for further processing, following which the central node communicates the details of the varying to at least a second number of base stations.

In an alternative embodiment, the interference measurements are carried out by at least a first number of the base stations, which then communicate the results of the measurements to each other for further processing, following which said base stations act upon the received results in order to decide the details of the varying amongst each other The invention also discloses a radio base station which functions according to the invention.

BRIEF DESCRIPTION OF THE DRAWINGS

The invention will be described in more detail in the following, with reference to the appended drawings, in which.

DETAILED DESCRIPTION

Figure 1:
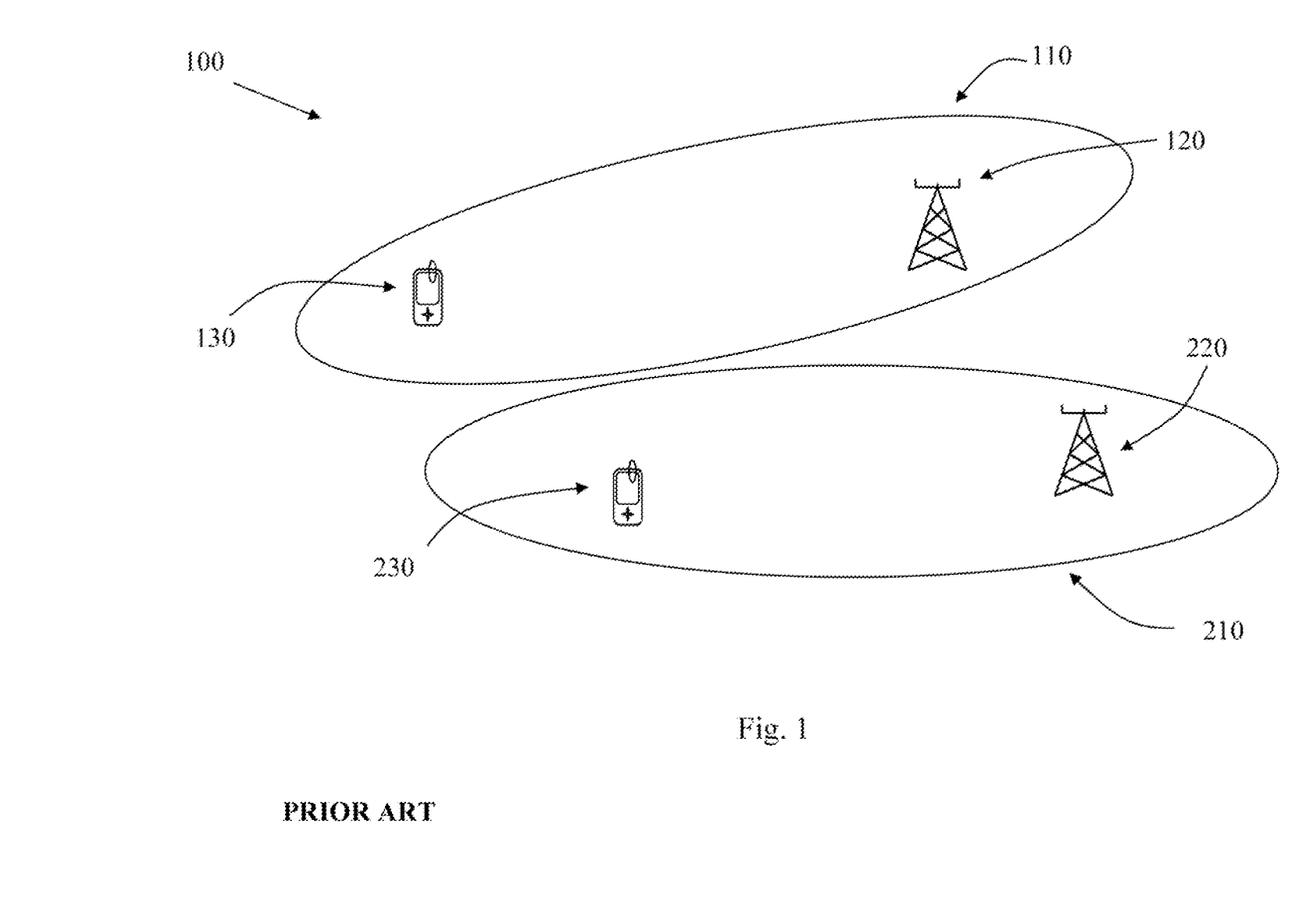
FIG. 1 shows an example of a system in which the invention may be applied.

FIG. 1 shows an example of a wireless access system 100 in which the invention may be applied. The system 100 shown in FIG. 1 is a cellular wireless system, and as such comprises a number of cells, two of which are shown in FIG. 1 with the reference numbers 110 and 210.

It should be pointed out that although the system 100 which is shown in FIG. 1 and in the description below, as well as in some of the other drawings, is a cellular wireless system, this is not intended to restrict the scope of protection afforded by the present text, the system 100 is merely to be seen as an example intended to facilitate the reader's understanding of the invention. The invention may equally well be applied to other kinds of wireless access systems.

The cells 110, 210, each comprise at least one radio base station, an RBS, shown as 120 and 220 in FIG. 1. The RBSs 120, 220, serve, inter alia, to control the traffic to and from user terminals in their respective cells. The cells 110, 210, can each accommodate at least one user terminal, a UE, and FIG. 1 shows one UE in each cell, with the reference numbers 130 and 230.

The system 100 for which the invention is intended is one in which communication to the UEs 130, 230, from their RBSs 120, 220, can be scheduled to take place during a first period in time, usually referred to as the down link period, DL, and the traffic from the UEs 130, 230, to the RBSs 120, 220, can be scheduled to take place during a second period in time, referred to as the up link period, UL.

The invention is especially suitable for a so called TDD system, Time Division Duplex, in which the UL and the DL are transmitted on the same frequency, but are separated in time.

Figure 2:
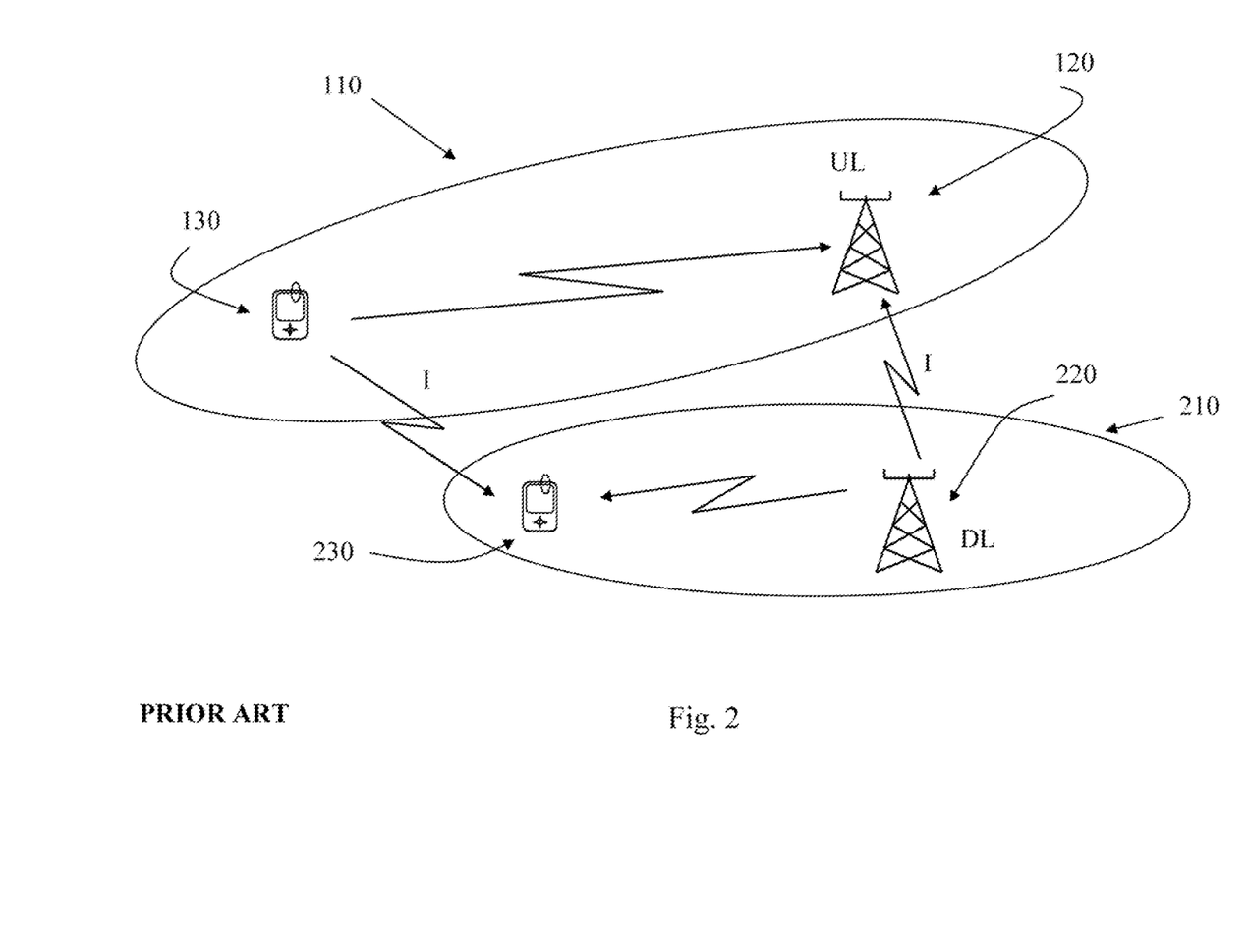
FIG. 2 shows a problem of the system of FIG. 1.

FIG. 2 shows a problem which may occur in TDD systems such as the system 100 shown in FIG. 1: The UE 130 in the first cell 110 is shown transmitting to its RBS 120, since the cell 110 is in the up link, UL, mode. At the same time, the nearby cell 210 is in the down link, DL, mode, which means that the radio base station, RBS, 220, of that cell is transmitting to the UE 230 in that cell.

Thus, the transmissions from the RBS 220 which is in DL mode may be received at the RBS 120 which is in the UL mode. This is shown in FIG. 2 by means of an arrow from the RBS 220 to the RBS 120.

Both of the arrows in FIG. 2 which show interfering transmissions are marked as "I".

Figure 3:
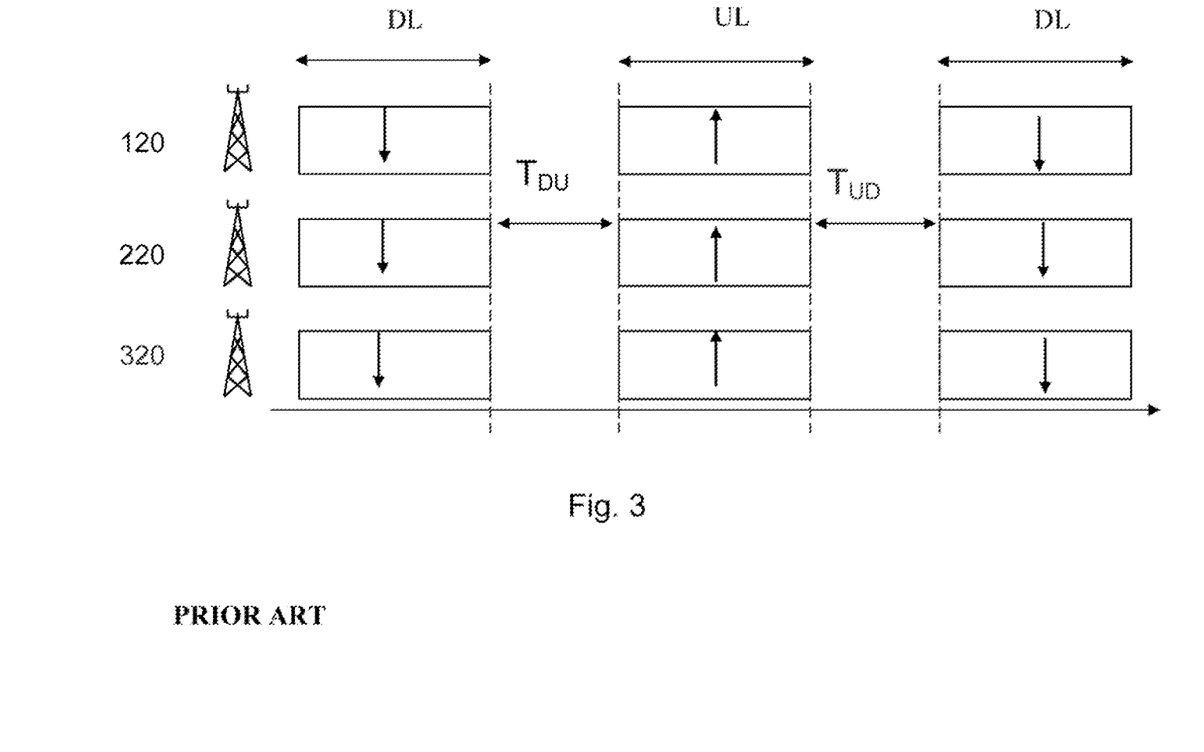
FIG. 3 shows a prior art solution to the problem of FIG. 2.

The interference problems illustrated in FIG. 2 have hitherto been addressed, inter alia, by means of the solution shown in FIG. 3: The RBSs in the system are synchronized, so that the uplink and downlink periods occur simultaneously in all cells within one and the same geographic area.

This is depicted in FIG. 3 which shows the timing for three RBSs, the two 120, 220, from FIGS. 1 and 2, as well as an additional RBS 320 in a third cell in the same area as the other two RBSs. The up link period is indicated as UL in FIG. 3, and the down link period is indicated as DL in FIG. 3. In addition, the DL and UL periods are shown in FIG. 3 by means of arrows which point "up" or "down".

Also shown in FIG. 3 is the fact that so called "guard periods" may be inserted at the transition between DL and UL, these periods being shown as $T_{DU}$ in FIG. 3, and also at the transition from UL to DL, referred to as $T_{DU}$ in FIG. 3.

The guard periods $T_{UD}$ and $T_{DU}$ are not chosen in the same manner: Typically, the guard time at a switch from downlink to uplink, $T_{DU}$, is chosen to match the sum of the maximum roundtrip propagation delay in the cell and the time it takes for a UE to switch from reception to transmission.

The transmission timing of the UE may be controlled so that a UE with long propagation time to its RBS will starts its transmission to the RBS earlier than other UEs in the same cell to compensate for the propagation delay, so that all traffic from the UEs in one and the same cell will be received within the uplink window at the RBS of the cell.

The guard period at the switch from uplink and downlink, $T_{UD}$, on the other hand, is usually chosen to match the time it takes for the base station to switch from reception to transmission, and the time it takes for a (nearby) terminal to switch from transmission to reception.

However, despite the fact that all cells, at least within one and the same area, can be synchronized, interference problems can still occur, especially between RBSs in the system. For example, at the end of the uplink period, an RBS may, for example due to a synchronization error, start to transmit too early, causing transmissions which may be received at other RBSs, particularly those nearby. Another interference problem between the RBSs of the system 100 of FIGS. 1 and 2 can be caused by the fact that transmissions from more distant RBSs will still be "in the air" in the beginning of the uplink period, due to the inherent propagation delay.

Figure 4:
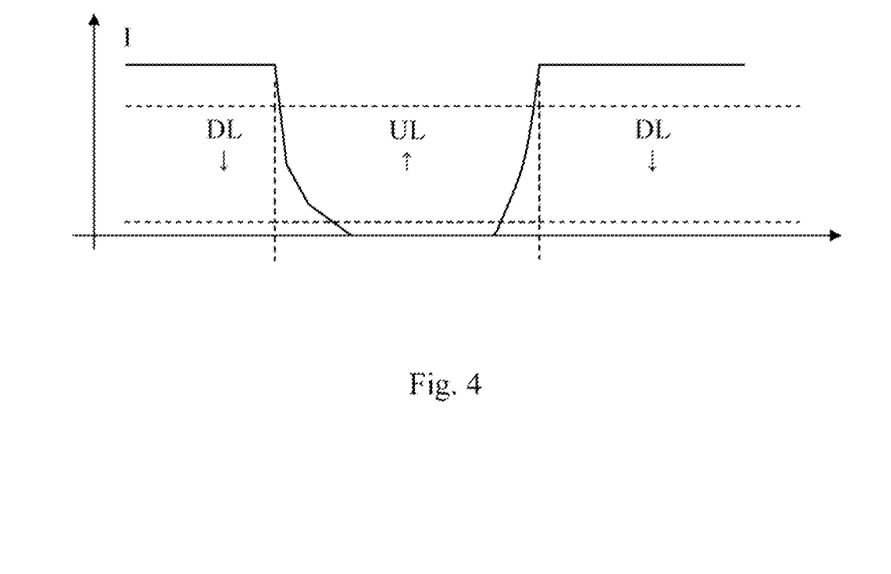
FIG. 4 shows a problem which the invention may be used to address.

The effect of such inter-RBS interference is shown in the diagram of FIG. 4, in which RBS to RBS interference is shown as a function of time, with the DL and UL periods being shown on the horizontal (time) axis. As can be seen, there is a degree of interference at the beginning of the UL period, caused, inter alia, by the effects explained above.

Thus, in order to address, inter alia, the interference problems described above, mainly in a TDD system, a principle of the present invention is to carry out interference measurements and/or performance measurements, and to, based on these measurements, if necessary, adapt one or both of the guard periods at the transitions from down link to up link and at the transition from up link to down link for RBSs in the same area in order to avoid RBS-RBS interference.

Figure 5:
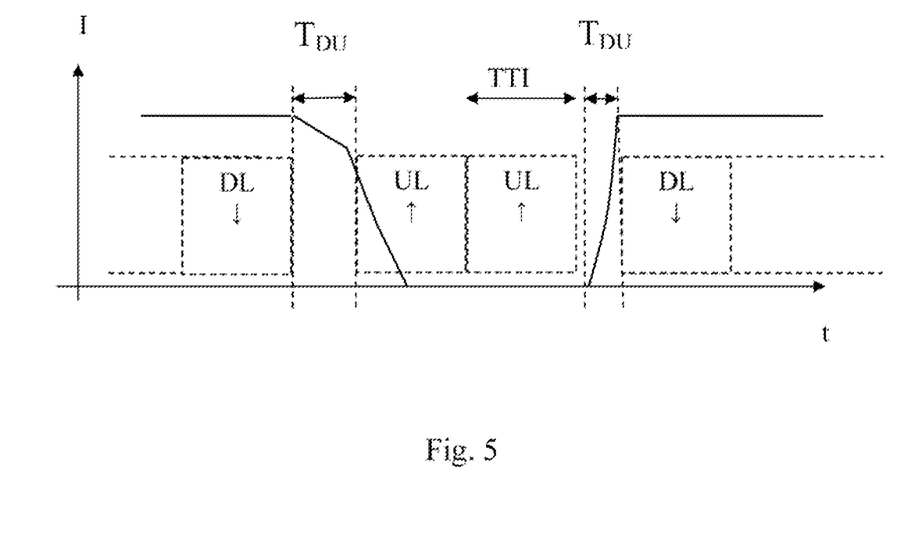
FIG. 5 shows the use of sub frames in the up link in a TDD system.

A concept new to this text will now be introduced: Sub frame, also sometimes referred to as TTI, Transmission Time Interval. In, for example, the LTE, Long Term Evolution, as an example, a scheduler in the RBSs controls when the different UEs in the cell of the RBS will transmit and receive data. The minimum time unit that a scheduler works is the sub frame. This is shown very schematically in the UL of FIG. 5.

The interference measurements of the invention are suitably carried out with at least sub frame granularity, and based on these measurements, if necessary, there is an adjustment of one or both of the guard periods at the DL to UL or UL to DL transitions for base stations in the same area.

In one embodiment of the present invention, the measurements are carried out by measuring means in the RBSs and are then reported to a central node, such as an O&M node (Operation and Maintenance) or an Access Gateway, AGW, in the system for further processing. The central node then distributes information to those RBSs whose guard period $T_{DU}$ (transition form DL to UL) or $T_{UD}$ (transition from UL to DL) are to be adjusted, so that they may adjust or vary the guard period or periods accordingly. Suitably, the RBSs that have a guard period $T_{DU}/T_{UD}$ adjusted according to the measurements and the further processing are those that participated in the collecting of the interference measurements, but this is not a necessity.

Figure 6:
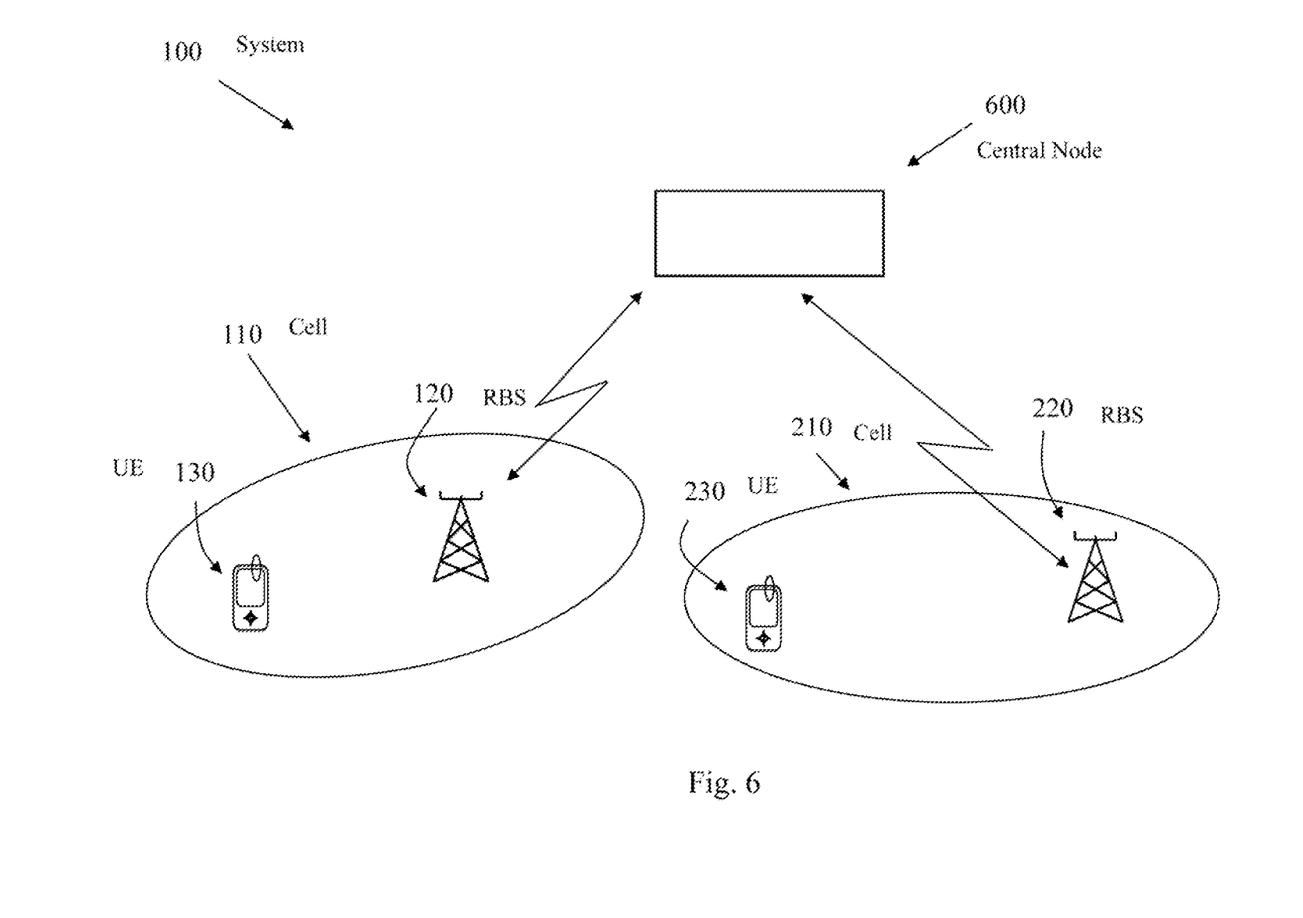
FIGS. 6 and 7 show embodiments of the invention.

This embodiment, i.e. the use of a central node which collects the results of the measurements, processes them and distributes information about the length of $T_{DU}$ to the RBSs is shown schematically in FIG. 6, employed in the system 100 of FIGS. 1 and 2. Thus, the central node 600 is shown in FIG. 6, as well as the two cells 110, 210, of FIGS. 1 and 2 with their RBSs 120, 220, and their UEs 130, 230.

The communication of measurements results from the RBSs 120, 220, to the central node 600, and the communication from the central node 600 to the RBSs is shown by means of arrows between the RBSs and the central node 600.

It should be pointed out that although only two base stations are shown in FIG. 6 and described in connection with that figure, this amount is merely an illustrative example intended to facilitate the explanation of the invention, the invention can in principle be used with a more or less arbitrary amount of RBSs.

Figure 7:
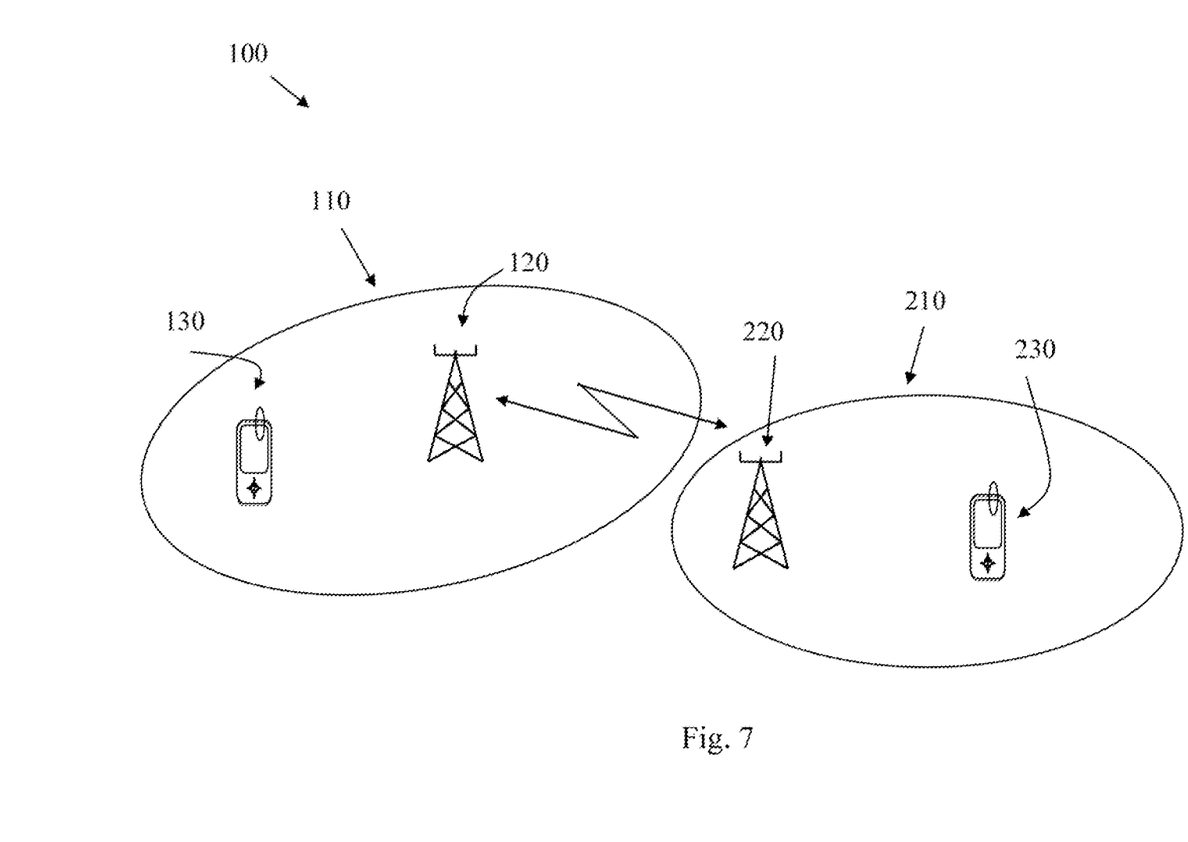

FIG. 7 shows a variation of the invention, applied in the system 100: in the embodiment shown in FIG. 7, the interference measurements are carried out by the RBSs 120, 220 of the cells 110, 210, which then communicate the results of the measurements to each other for further processing at the RBSs, following which the base stations exchange information between themselves which enable them to decide the necessary varying of $T_{DU}$ amongst each other. In similarity to the embodiment shown in FIG. 6, this embodiment can be applied in a group of RBSs with more or less an arbitrary amount of members. However, as opposed to the embodiment of FIG. 6 with a central node, the embodiment of FIG. 7 imposes more stringent demands for the RBSs involved as they need to be connected to each other in some way.

It should also be pointed out that guard period variations may be applied only to a subset of the RBSs which have problems due to interference, or which are believed to cause a problem, e.g. due to the fact that they are close or in the same area.

Figure 8:
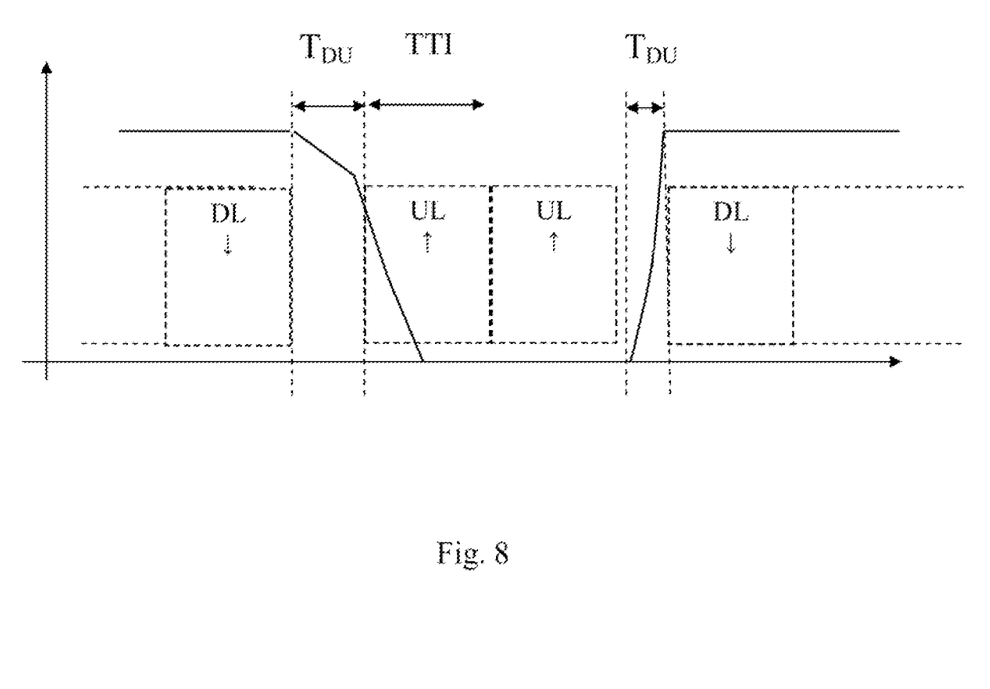
FIGS. 8 and 9 show a more detailed view of a problem and its solution according to the invention.

A typical example of an application of the invention will now be described with reference to FIG. 8, and the system 100 of FIG. 6: the base stations 120, 220, each measure the interference level in their respective cells, suitably during the uplink period, and also suitably with an appropriate resolution, such as TTI-level, which is shown in FIG. 8.

The results of the interference measurements are averaged per TTI, suitably at each RBS, and then, in the embodiment of FIG. 6, reported to the central node 600.

In the case shown in FIG. 8, which illustrates an exemplary measurement from one RBS, the central node 600 will detect that the interference in the first uplink sub frame after the downlink period is higher than the interference level in the other uplink TTIs. The central node 600 will then transmit commands to increase the guard period $T_{DU}$ for RBSs which may cause interference for each other, typically in the same geographic area. In a similar manner, high levels of interference in the last part of the up link which are detected can be remedied by increasing the guard period $T_{UD}$.

One way of increasing $T_{DU}$ is to add or insert more idle symbols at the end of the last DL TTI, and thus making the resulting total DL period shorter. This is shown in FIG. 9, which depicts the same interference situation as in FIG. 8, but as can be seen, thanks to the extended $T_{DU}$, the interference level in the first UL sub frame has decreased as compared to FIG. 8.

Figure 9:
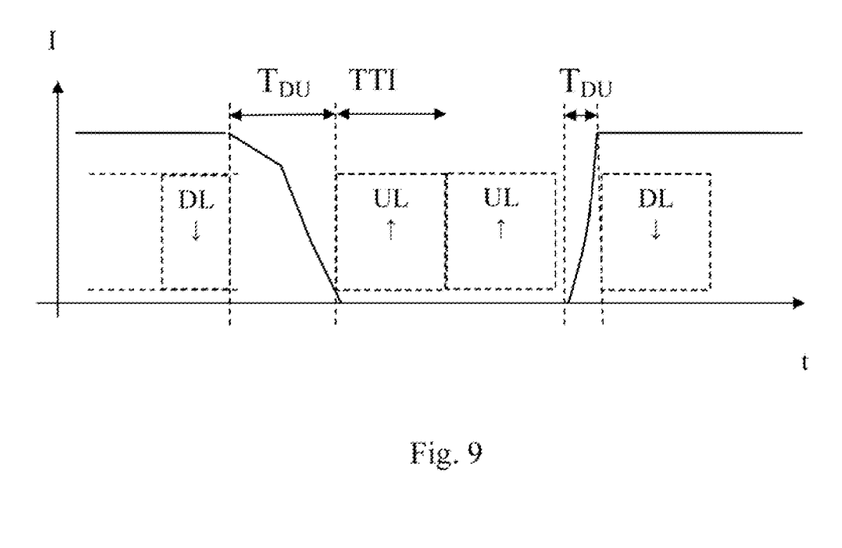

Thus, as shown in FIG. 9, by adding more idle DL symbols at the end of the DL period, the guard period is made so large that the interference variations during the uplink period is low. In effect, part of the last of the DL sub frame is "silenced", thereby in effect increasing $T_{DU}$.

As an alternative, if, for example, there is a high level of interference detected in the last part of the UL, this can be addressed by increasing the guard period $T_{UD}$ at the transition from Up Link to Down Link, which can suitably be carried out in the following manner: the Down Link is shortened, suitably in the same manner as described above, i.e. by silencing a number of sub frames at the end of the Down Link, and the Up Link period is moved forward in time, i.e. moved closer in time to the end of the Down Link period, so that the "slack" created by the silenced Down Link sub frame or frames is utilized in order to create an increased guard period $T_{UD}$.

Naturally, the two guard periods $T_{UD}$ and $T_{DU}$ can both be extended or increased if necessary.

In alternative embodiments disclosed by the invention, the central node 600 controls the "measurement windows" at the base stations, so that, for example, the interference measurements are carried out during, for example, idle periods which were inserted at the end of the DL in order to create a longer $T_{DU}$. The central node can then command the RBSs to decrease the guard periods, if it is found that the guard period $T_{DU}$ are too long.

Also, in an alternative embodiment of the invention, the RBSs can directly measure their respective required guard period $T_{DU}$/$T_{UD}$ determining the duration for which the interference is too high and report this to the central node. The central node will then process the reports and communicate the new $T_{DU}$ and or $T_{UD}$ to the RBSs involved, suitably by using the longest $T_{DU}$ and/or $T_{UD}$ required.

Turning now in more detail to how the interference measurements of the invention are carried out, some examples may be given: performance parameters such as BER, BLER (block error level) and traffic throughput may be measured at the RBSs as indicators of the interference level in the cells, and be reported directly or in processed from to the central node or the other RBSs, as the case may be.

Additionally, other measurements such as, for example, the total received power at the RBS can also be used as an indication of the interference level in a cell.

Figure 10:
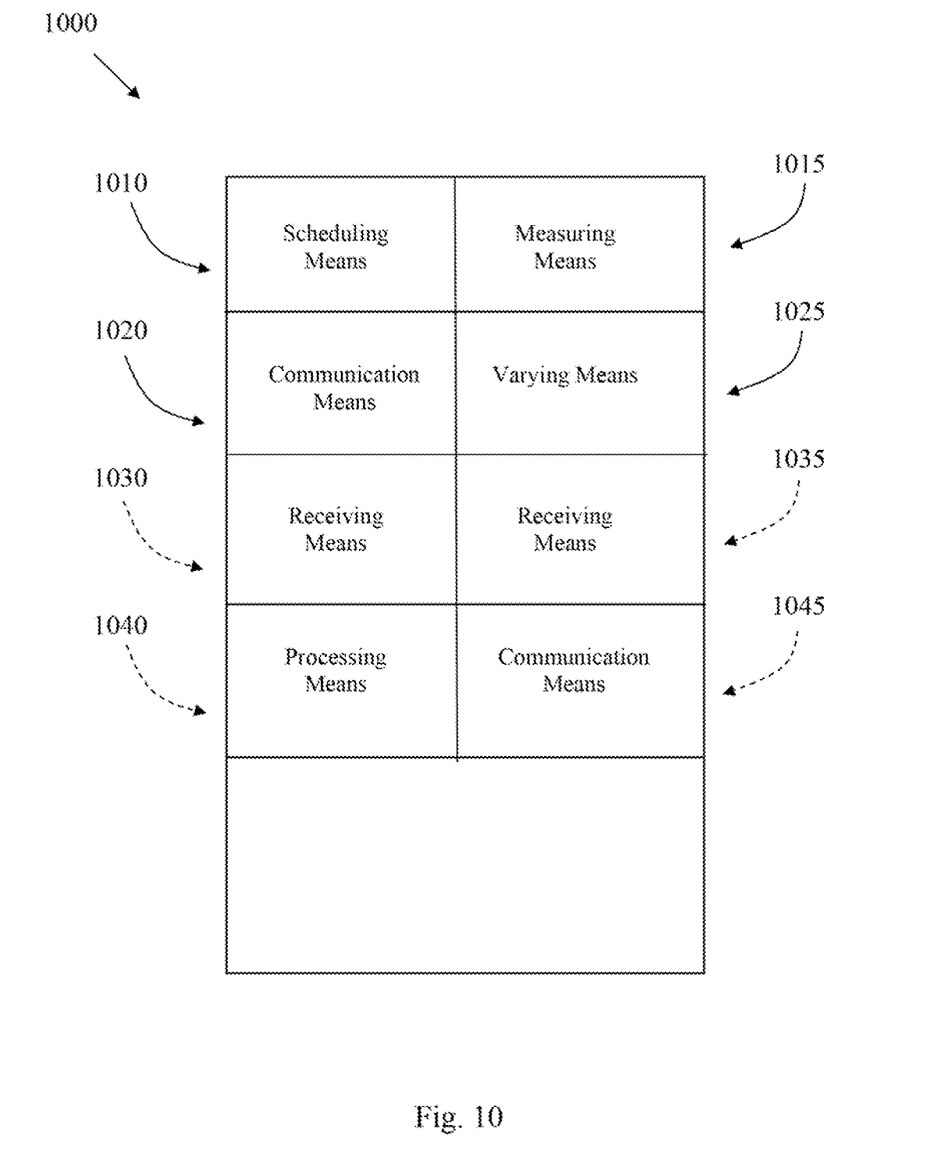
FIG. 10 shows an RBS of the invention with some of its major components.

FIG. 10 shows a schematic overview of an RBS 1000 of the invention, with some of its major components. Components which are options or alternatives are referenced with arrows with dashed lines.

Thus, the RBS 1000 comprises scheduling means 1010 for scheduling user terminals in its cell to receive traffic from the base station during the down link period, as well as for scheduling the user terminals to transmit traffic to RBS during the up link period, in addition to which the scheduling means 1010 schedule the guard period $T_{DU}$ at the transition from the down link period to the up link period and the guard period $T_{UD}$ at the transition from the up link period to the down link period.

The RBS 1000 also comprises means 1015 for measuring the interference level in the cell during at least part of the time between two consecutive down link periods.

Included in the RBS 1000 are also means 1020 for communicating the results of the interference measurements to another party in the system, as well as means 1025 for varying at least the duration of the guard period $T_{DU}$ as a result of a processing of the measured interference level.

Suitably, the varying means mentioned above will increase the duration of the guard period $T_{DU}$ as a result of said processing, preferably by means of silencing at least a portion of the down link period which adjoins the guard period $T_{DU}$, so that the effect of a longer guard period is obtained.

The RBS 1000 may also comprise means 1030 for receiving the results of the processing of the measured interference level from another party in the system, and these means 1030 may also be adapted to use said results to carry out the varying of the guard period $T_{DU}$.

As an alternative to the means 1030, the RBS may comprise means 1035 for receiving the results of interference measurements from a first number of other radio base stations in the system, as well as means 1040 for carrying out the processing of those results, and also means 1045 for communicating the results of said processing to at least part of said first number of other radio base stations.

Figure 11:
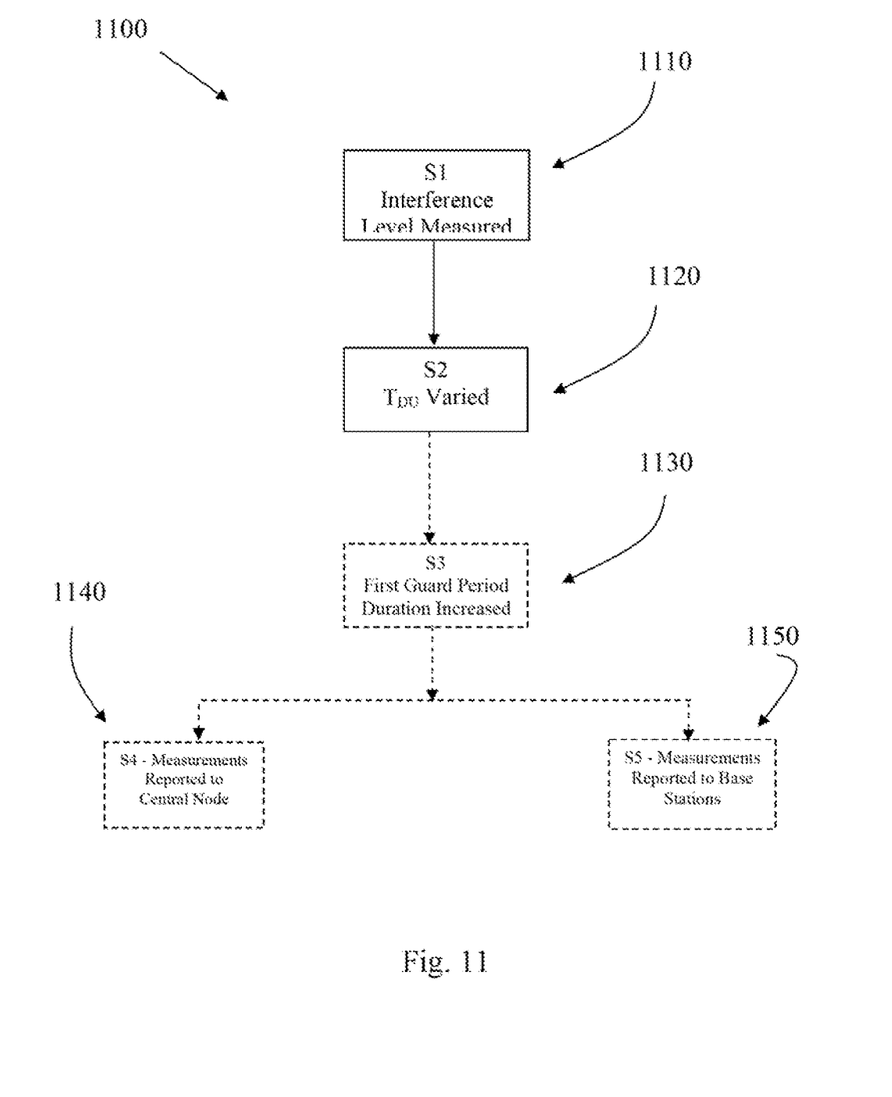
FIG. 11 shows a schematic flow chart of the method of the invention.

Turning now to FIG. 11, a schematic flow chart 1100 of some of the major steps of the method of the invention are shown, with steps that are options or alternatives being shown with dashed lines and arrows:

In step S1, 1110, the interference level in at least a sub set of the cells of the system in which the invention is applied is measured during at least a part of the time between two consecutive down link periods.

Suitably, the interference level which is measured is the level of the interference received at each of said second plurality of base stations.

Following the measurements of step S1, in step S2, 1120, the duration of the guard period between down link and up link, $T_{DU}$, is varied in said sub set of cells in accordance with the measured interference level.

In step S3, 1130, the duration of said first guard period is increased as a consequence of the measured interference level, suitably by means of silencing at least a portion of the down link period which adjoins the guard period $T_{DU}$, so that the effect of a longer guard period is obtained.

As indicated in step S4, 1140, the interference measurements can be carried out by at least a first number of the base stations in the system, and then reported to a central node for further processing, following which the central node communicates the varying of $T_{DU}$ to at least a second number of base stations.

As an alternative to step S4, step S5, 1150 shows that the interference measurements are carried out by at least a first number of the base stations in the system, which then communicate the results of the measurements to each other for further processing, following which said base stations act upon the received results in order to decide the varying of $T_{DU}$ amongst each other.

The invention is not limited to the examples of embodiments shown and described above, but may be freely varied within the scope of the appended claims.

It should also be pointed out that the invention comprises measuring the interference level in a number of cells and adapting one or both of the guard periods $T_{DU}$ and $T_{UD}$: as such, the adapting of the guard periods may also comprise keeping them intact as they are, if the interference measurements do not indicate that a change is necessary. In addition, the adapting may also comprise decreasing one or both of said guard periods $T_{UD}$, $T_{DU}$, which have been increased, suitably by means of activating symbols which have been made idle in order to create longer guard periods.

The invention claimed is:

1. A method for use in a cellular wireless access system comprising a first plurality of radio base stations for the control of traffic to and from respective cells in the system, each of said cells being able to accommodate at least a first user terminal, in which system the user terminals In said cells can be scheduled for receiving traffic from their respective base stations during a first time period, the down link period, and in which system the user terminals in said cells can be scheduled for transmitting traffic to their respective base stations during a second time period, the up link period, and in which system there is a first guard period at the transition from the down link period to the up link period, and a second guard period at the transition from the up link period to the down link period, the method comprising the step of measuring the interference level in at least a second plurality of said cells during at least a part of the time between two consecutive down link periods, further comprising the step of adapting the duration of one or both of said first and second guard periods in said second plurality of cells in accordance with the measured interference level.

2. The method of claim 1, according to which the interference level which is measured is the level of the interference received at each of said second plurality of base stations.

3. The method of claim 1, according to which the duration of said first or second guard periods is increased as a consequence of the measured interference level.

4. The method of claim 3, according to which the increase of said first guard period is carried out by means of silencing at least a portion of the down link period which adjoins the first guard period, so that the effect of a longer guard period is obtained.

5. The method of claim 3, according to which the duration of said second guard period is increased by means of silencing at least a portion of the down link period which adjoins the first guard period, so that the up link period can be moved forward in time, thus creating a longer second guard period.

6. The method of claim 1, according to which the duration of said first or second guard periods is decreased as a consequence of the measured interference level.

7. The method of claim 1, according to which the interference measurements are carried out in at least part of one of said first or second guard periods or in at least part of one of the up link period.

8. The method of claim 1, according to which the interference measurements are carried out by at least a first number of the base stations and then reported to a central node for further processing, following which the central node communicates the varying to at least a second number of base stations.

9. The method of claim 1, according to which the interference measurements are carried out by at least a first number of the base stations, which then communicate the results of the measurements to each other for further processing, following which said base stations act upon the received results in order to decide the varying amongst each other.

* * * * *

UNITED STATES PATENT AND TRADEMARK OFFICE
CERTIFICATE OF CORRECTION

| | | |
|---|---|---|
| PATENT NO. | : 8,537,688 B2 | Page 1 of 1 |
| APPLICATION NO. | : 12/528344 | |
| DATED | : September 17, 2013 | |
| INVENTOR(S) | : Astely et al. | |

It is certified that error appears in the above-identified patent and that said Letters Patent is hereby corrected as shown below:

On the Title Page, item (57), under "ABSTRACT", in Column 2, Line 8, delete "(TDu)" and insert -- ($T_{DU}$) --, therefor.

On the Title Page, item (57), under "ABSTRACT", in Column 2, Line 9, delete "(TUD)" and insert -- ($T_{UD}$) --, therefor.

In the Specification:

In Column 5, Line 47, delete "(transition form DL" and insert -- (transition from DL --, therefor.

In the Claims:

In Column 8, Line 49, in Claim 1, delete "terminals In" and insert -- terminals in --, therefor.

Signed and Sealed this
Fifteenth Day of July, 2014

Michelle K. Lee
*Deputy Director of the United States Patent and Trademark Office*